US006385039B1

(12) United States Patent
Chiang et al.

(10) Patent No.: US 6,385,039 B1
(45) Date of Patent: May 7, 2002

(54) PORTABLE COMPUTER ASSEMBLY WITH A DETACHABLE BATTERY MODULE

(75) Inventors: Jung-Sheng Chiang; Chuan-Yuan Lee, both of Taipei (TW)

(73) Assignee: Compal Electronics, Inc., Taipei (TW)

( * ) Notice: Subject to any disclaimer, the term of this patent is extended or adjusted under 35 U.S.C. 154(b) by 0 days.

(21) Appl. No.: 09/854,670

(22) Filed: May 15, 2001

(30) Foreign Application Priority Data

Mar. 26, 2001 (TW) .......................................... 090204577

(51) Int. Cl.⁷ ................................................ H05K 7/16
(52) U.S. Cl. ...................... 361/683; 361/759; 292/148; 364/708.1
(58) Field of Search ................................. 361/683–686, 361/724–727, 680–681, 740, 759; 364/708.1; 70/57–58, 85; 292/42, 148, 151 R, 307 R

(56) References Cited

U.S. PATENT DOCUMENTS 6,266,235 B1 * 7/2001 Leman ........................ 361/681
6,275,376 B1 * 8/2001 Moon ......................... 361/683

* cited by examiner

Primary Examiner—Leo P. Picard
Assistant Examiner—Hung Van Duong
(74) Attorney, Agent, or Firm—Foley & Lardner

(57) ABSTRACT

A portable computer assembly includes a battery module mounted detachably on a keyboard module which includes a keyboard housing formed with a slot that is accessible from bottom and rear sides of the keyboard housing and that has a first electrical connector unit disposed therein. The battery module includes an elongated battery housing with a second electrical connector unit for engaging the first electrical connector unit. First and second mounting units are provided on opposite ends of the battery housing and have cylindrical studs for coupling pivotally with left and right side walls of the keyboard housing. The stud of the second mounting unit is capable of disengaging the keyboard housing when a press button of the second mounting unit is operated.

3 Claims, 5 Drawing Sheets

PORTABLE COMPUTER ASSEMBLY WITH A DETACHABLE BATTERY MODULE

BACKGROUND OF THE INVENTION

1. Field of the Invention

The present invention relates to a portable computer assembly, more particularly to a portable computer assembly having a battery module which is easily assembled to and detached from a keyboard module of the portable computer assembly.

2. Description of the Related Art

FIG. 1 illustrates a conventional portable computer assembly 1 that includes a computer unit 10 and a detachable battery unit 90. The computer unit 10 has a keyboard housing with left and right side walls, each of which has a rear end formed with a pivot hole 93 that is provided with an electrical connector (not shown) therein. A bottom side of the keyboard housing is provided with a pair of resilient retaining members 94 proximate to the pivot holes 93, respectively. The battery module 90 has an elongated battery casing with two opposite ends, each of which has a mounting plate 91 projecting transversely from the battery casing. Each of the mounting plates 91 has one side confronting the other one of the mounting plates 91 and formed with an electrical contact 92 which is in the form of a cylindrical stud and which is extendible into a respective one of the pivot holes 93 for connecting electrically with the electrical connectors in the pivot holes 93. After assembly, the battery unit 90 is pivotable downwardly relative to the keyboard housing about an axis of the cylindrical studs 92 such that the battery unit 90 can serve as a foot member for raising and supporting a rear part of the computer unit 10. To assemble the battery unit 90 to the computer unit 10 or to detach the battery unit 90 from the computer unit 10, the computer unit 10 is turned upside-down. Then, the resilient retaining members 94 are operated by fingers on both hands of the user, and the battery unit 90 is held by the other fingers on both hands of the user and is brought toward the computer unit 10 to enable extension of the electrical contacts 92 into the pivot holes 93 or is pulled away from the computer unit 10 to permit removal of the electrical contacts 92 from the pivot holes 93. As such, the assembly and detachment operations are not convenient to conduct, and may result in damage to the computer unit 10 and the battery unit 90.

SUMMARY OF THE INVENTION

Therefore, the main object of the present invention is to provide a portable computer assembly having a detachable battery module which is easily operable for assembling to and detaching from a keyboard module of the portable computer assembly.

Accordingly, the portable computer assembly of the present invention includes a keyboard module, a display module, and a battery module. The keyboard module includes a keyboard housing having front and rear ends, top and bottom sides, and a surrounding wall extending between the top and bottom sides. The surrounding wall includes front and rear walls and left and right side walls interconnecting the front and rear walls. The keyboard housing is formed with a connector mounting slot which is accessible from the bottom side and the rear end of the keyboard housing. The keyboard module further has an electrical connector unit disposed in the connector mounting slot adjacent to the rear end of the keyboard housing. Each of the left and right side walls is formed with a pivot hole adjacent to the rear end of the keyboard housing. The display module includes a display housing having a lower end connected pivotally to the rear end of the keyboard housing. The battery module includes an elongated battery housing adapted for receiving a battery set therein. The battery housing has first and second ends which are opposite to each other in a longitudinal first direction of the battery housing. The battery module further includes a second electrical connector unit which projects from the battery housing in a second direction transverse to the first direction, which is adapted to connect electrically with the battery set that is received in the battery housing, and which is extendible into the connector mounting slot in the keyboard housing for connecting matingly with the first electrical connector unit so as to supply electric power to the keyboard module. The battery module further includes confronting first and second mounting units mounted respectively on the first and second ends of the battery housing and projecting relative to the battery housing in the second direction. The first mounting unit has a distal end provided with a first cylindrical stud which extends in the first direction toward the second mounting unit and which is inserted rotatably and removably into the pivot hole in one of the left and right side walls of the keyboard housing. The second mounting unit includes a casing, a depressible operating member, a pivot shaft, a second cylindrical stud, a lever and a biasing member. The casing has a connecting end portion secured to the second end of the battery housing, and a mounting end portion extending from the connecting end portion and projecting relative to the battery housing in the second direction. The casing has a first side wall facing the first mounting unit, and a second side wall opposite to the first side wall in the first direction. The depressible operating member is mounted on the second side wall of the casing at the connecting end portion of the casing. The pivot shaft is mounted fixedly in the casing between the connecting and mounting end portions, and extends in a third direction transverse to the first and second directions. The second cylindrical stud is mounted on the first side wall of the casing at the mounting end portion of the casing, and is inserted rotatably and removably into the pivot hole in the other one of the left and right side walls of the keyboard housing. The lever is disposed in the casing, and has a first end connected pivotally to the depressible operating member, a second end opposite to the first end and connected pivotally to the second cylindrical stud, and an intermediate portion mounted pivotally on the pivot shaft. The biasing member is disposed in the casing for biasing the depressible operating member in a direction away from the first side wall to enable the depressible operating member to project from the second side wall and to enable the second cylindrical stud to project from the first side wall of the casing. The depressible operating member is depressible against biasing action of the biasing member so as to enable the lever to pivot about the pivot shaft and to retract the second cylindrical stud into the casing for disengaging the second cylindrical stud from the pivot hole in the other one of the left and right side walls of the keyboard housing.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
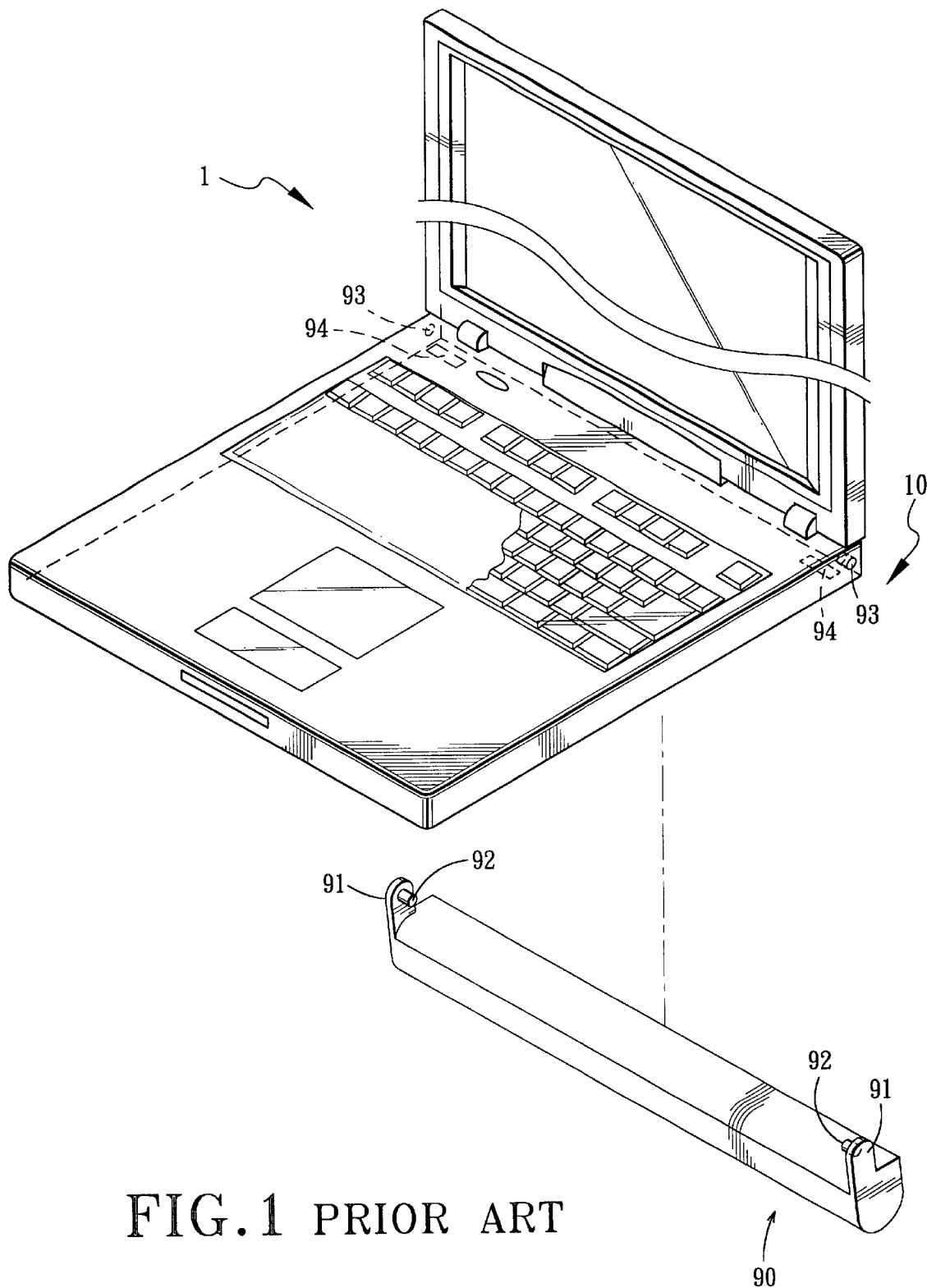
FIG. 1 is a partly exploded perspective view of a conventional portable computer assembly with a detachable battery unit.
Figure 2:
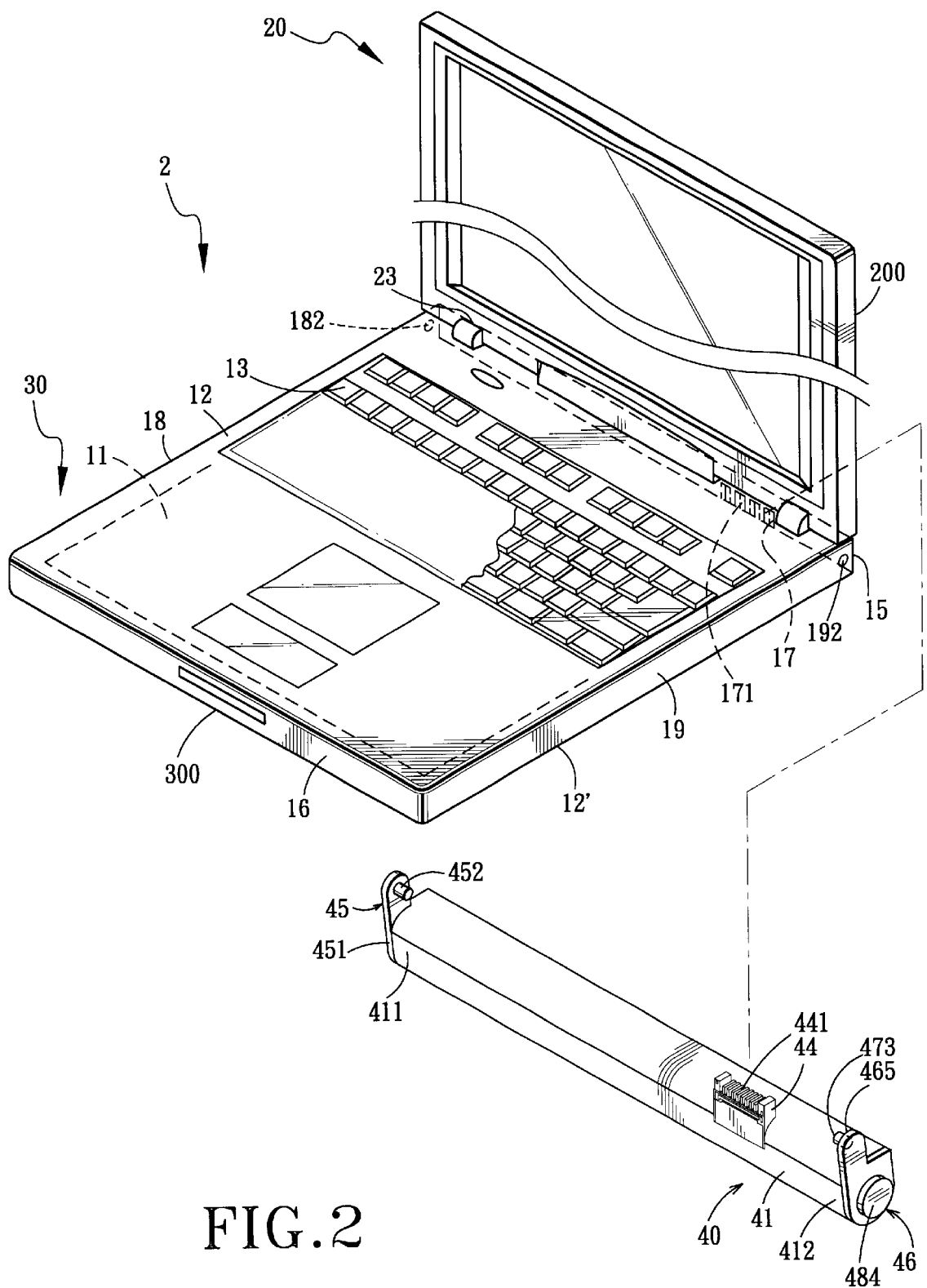
FIG. 2 is a partly exploded perspective view of a preferred embodiment of the portable computer assembly of the present invention.
Figure 4:
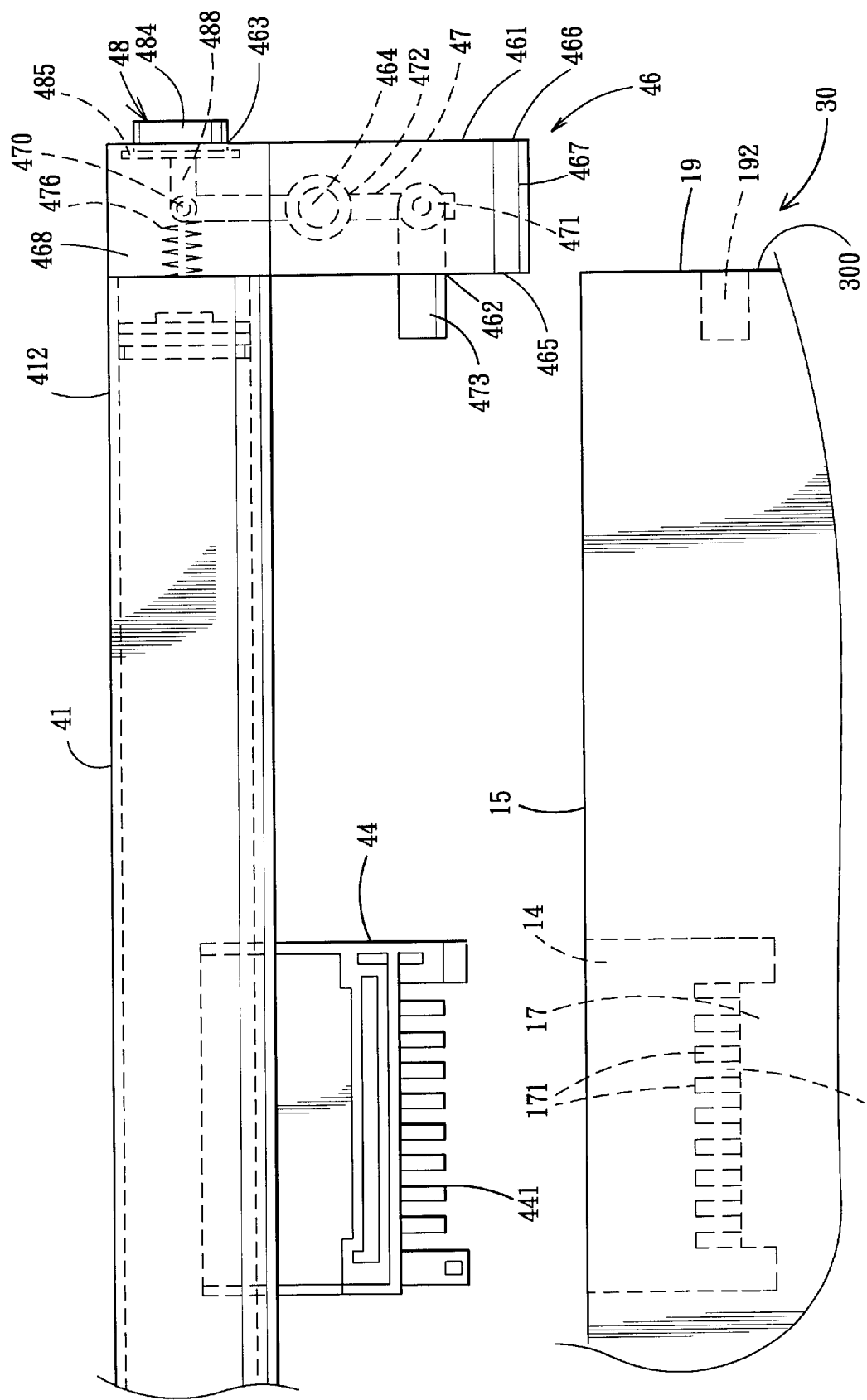
FIG. 4 is a fragmentary top view, illustrating how the battery module is assembled to a keyboard module of the portable computer assembly of the preferred embodiment.

Referring to FIGS. 2 and 4, the preferred embodiment of the portable computer assembly 2 of the present invention is shown to include a keyboard module 30, a display module 20, and a battery module 40.

The keyboard module 30 includes a keyboard housing 300 having a rear end connected pivotally to a lower end 23 of a display housing 200 of the display module 20 in a conventional manner. The keyboard housing 300 has a top side 12 mounted with a keyboard unit 13, a bottom side 12' and a surrounding wall extending between the top and bottom sides 12, 12'. A main circuit board 11 is disposed in the keyboard housing 300. The surrounding wall of the keyboard housing 300 includes front and rear walls 16, 15, and left and right side walls 18, 19 interconnecting the front and rear walls 16, 15. The keyboard housing 300 has a connector mounting slot 14 (see FIG. 4) which is accessible from the bottom side 12' and the rear end of the keyboard housing 300. The keyboard module 30 further has a first electrical connector unit 17 which is disposed in the slot 14 and which includes a plurality of resilient first contact terminal pairs 171. Each of the first contact terminal pairs 171 is transverse to the rear wall 15, and defines a clamping space 172.

Each of the left and right side walls 18, 19 is formed with a pivot hole 182, 192 adjacent to the rear end of the keyboard housing 300. The pivot holes 182, 192 extend along a horizontal axis parallel to the rear wall 15.

Figure 3:
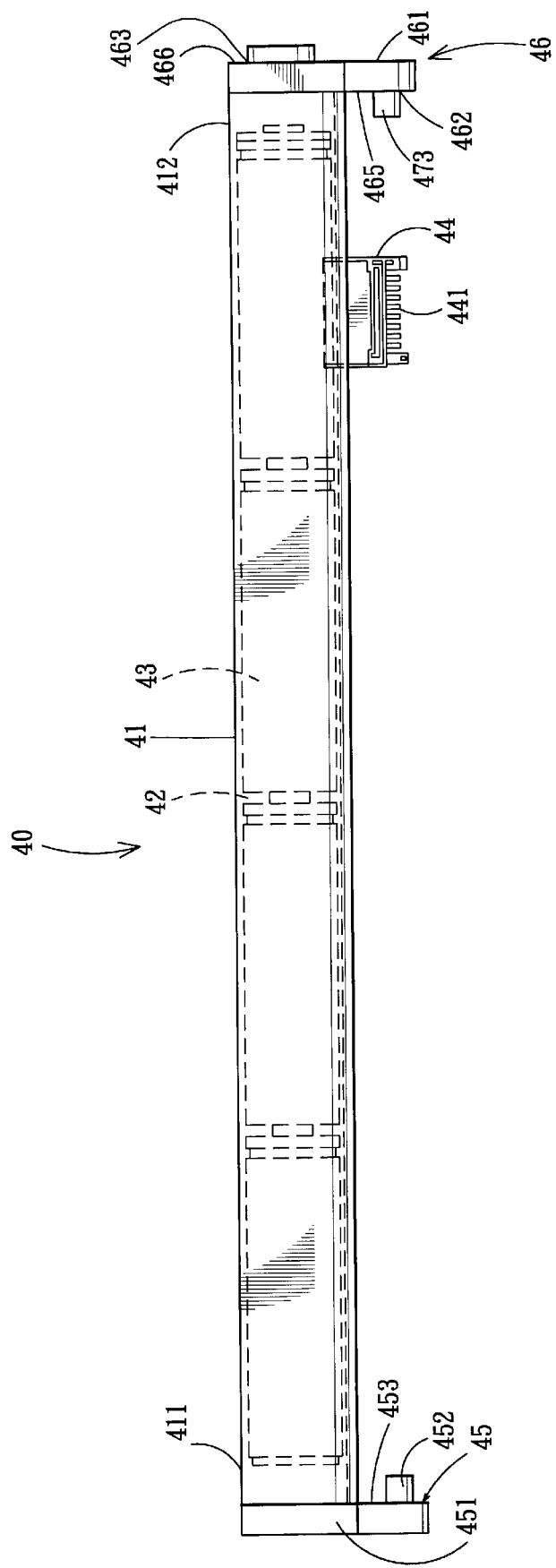
FIG. 3 is a top view of a battery module of the portable computer assembly of the preferred embodiment.

Referring to FIGS. 2 and 3, the battery module 40 includes an elongated battery housing 41 with first and second ends 411, 412 which are opposite to each other in a longitudinal first direction of the battery housing 41. The battery housing 41 is formed with a battery chamber 42 adapted for receiving a battery set 43 therein. The battery housing 41 is mounted with a second electrical connector unit 44 which has one end extending into the battery chamber 42 and adapted to connect electrically with the battery set 43 that is received in the battery housing 41, and another end projecting from the battery housing 41 in a second direction transverse to the first direction and formed with a plurality of parallel electrical contact terminals 441 that extend in the second direction.

The first and second ends 411, 412 of the battery housing 41 are formed respectively with first and second mounting units 45, 46. The first mounting unit 45 includes a mounting plate 451 projecting from the battery housing 41 in the second direction, and a first cylindrical stud 452 formed at a distal end of the mounting plate 451 on a surface 453 that confronts the second mounting unit 46. The first cylindrical stud 452 extends in the first direction toward the second mounting unit 46.

Referring to FIGS. 3 and 4, the second mounting unit 46 includes a casing 461 having a connecting end portion 468 secured to the second end 412 of the battery housing 41, and a mounting end portion 467 extending from the connecting end portion 468 and projecting relative to the battery housing 41 in the second direction. The casing 461 has a first side wall 465 facing the first mounting unit 45, and a second side wall 466 opposite to the first side wall 465 in the first direction. The first side wall 465 is formed with a first mounting hole 462 in the mounting end portion 467. The second side wall 466 is formed with a second mounting hole 463 in the connecting end portion 468. A depressible operating member 48 includes a press button 484 received in the second mounting hole 463, and a linking rod 488 disposed in the casing 461 and having one end secured to the press button 474. The press button 484 is formed with an annular peripheral flange 485 which is disposed within the casing 461 and which is wider than the second mounting hole 463. A pivot shaft 464 is mounted fixedly in the casing 461 between the connecting and mounting end portions 468, 467, and extends in a third direction transverse to the first and second directions. A second cylindrical stud 473 is mounted on the first side wall 465 in the first mounting hole 462, and has an inner end extending into the casing 461 and an outer end extendible out of the casing 461 via the first mounting hole 462. A lever 47 is disposed in the casing 461 and extends in the second direction along the length of the casing 461. The lever 47 has a first end 470 connected pivotally to another end of the linking rod 488, a second end 471 opposite to the first end 470 and connected pivotally to the inner end of the second cylindrical stud 473, and an intermediate portion 472 mounted pivotally on the pivot shaft 464. A biasing member, which is in the form of a compression spring 476, is disposed within the casing 461 between the first side wall 465 and the first end 470 of the lever member 47 for biasing the press button 474 away from the first side wall 465 so as to enable the press button 474 to project from the second side wall 466. The annular flange 488 abuts against an inner wall surface of the second side wall 466 when the press button 484 moves away from the first side wall 465 due to biasing action of the compression spring 476, thereby limiting movement of the press button 484 away from the first side wall 465 and preventing the press button 484 from moving out of the second mounting hole 463. When the press button 484 is depressed against biasing action of the compression spring 476, the lever 47 pivots about the pivot shaft 464 in a counter-clockwise direction to retract the second cylindrical stud 473 into the casing 461. When the depressing force is removed, the press button 484 once again moves away from the first side wall 465, and the lever 47 pivots about the pivot shaft 464 in the clockwise direction due to the biasing action of the compression spring 476, thereby enabling the second cylindrical stud 473 to project from the first mounting hole 462.

Figure 5:
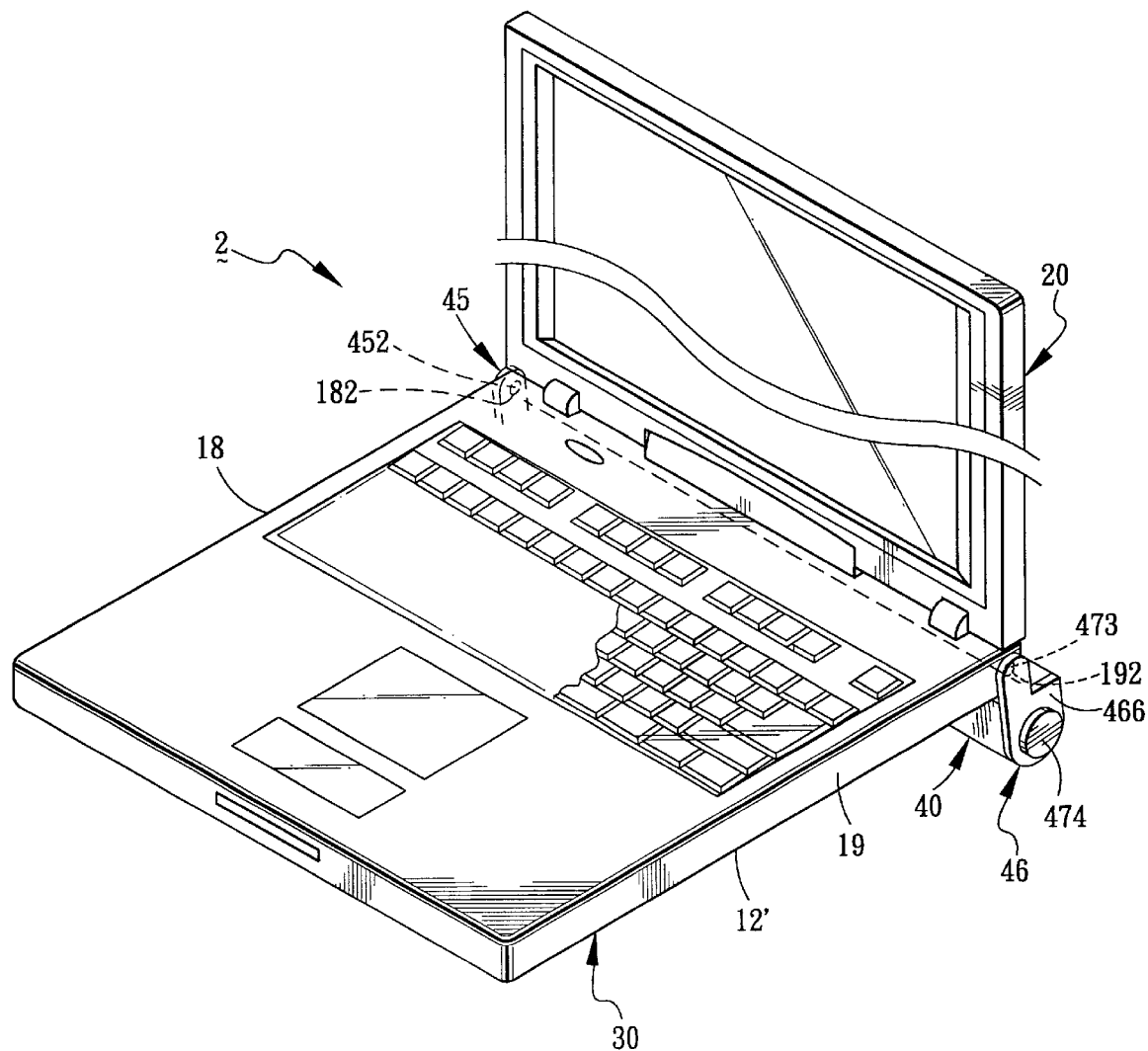
FIG. 5 is an assembled perspective view of the preferred embodiment, where the battery module is shown to be in a downward-turned position.

Referring to FIGS. 2 and 5, to assemble the battery module 40 to the rear end of the keyboard module 30, the battery module 40 is brought behind the rear wall 15 of the keyboard housing 300 such that the second electrical connector unit 44 is aligned with and is oriented toward the slot 14. Then, the first cylindrical stud 452 on the first mounting plate 451 is extended into the pivot hole 182 in the left side wall 18. The press button 474 is subsequently depressed to retract the second cylindrical stud 473 into the first mounting hole 462 in the casing 461, and the battery module 40 is moved toward the rear wall 15 to enable the second electrical connector unit 44 to extend into the slot 14 such that each of the first contact terminals 441 is extended into and is retained in the clamping space 172 of a respective one of the first electrical contact terminal pairs 171 to establish electrical connection therebetween, thereby permitting the supply of electric power to the main circuit board 11 of the keyboard module 30. When the depressing force is released, the second cylindrical stud 462 is enabled to project from the casing 461 and to extend into the pivot hole 192 in the right side wall 19 of the keyboard housing 300, thereby completing assembly of the battery module 40 to the keyboard module 30. After assembly, the battery housing 41 is pivotable relative to the keyboard housing 300 about the axis of the pivot holes 182, 192 for turning downwardly to the bottom side of the keyboard housing 300 so as to serve as a foot member for raising and supporting a rear part of the keyboard module 30. To disassemble the battery module 30, the press button 484 is depressed once again to retract the second cylindrical stud 473 into the casing 461 for disengaging the second cylindrical stud 473 from the pivot hole 192. At this time, the battery module 40 is removable from the keyboard module 30 by disengaging the second electrical connector unit 44 from the first connector unit 17 and disengaging the first cylindrical stud 452 from the pivot hole 182.

In the illustrated embodiment, only one of the mounting units is provided with a retractable stud. However, in another embodiment of the present invention, the mounting units on both ends of the battery housing of the battery module may be designed to be operable for retracting the cylindrical studs respectively into casings of the mounting units by depressing press buttons on the mounting units.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A portable computer assembly comprising:
   a keyboard module including a keyboard housing having front and rear ends, top and bottom sides, and a surrounding wall extending between said top and bottom sides, said surrounding wall including front and rear walls and left and right side walls interconnecting said front and rear walls, said keyboard housing being formed with a connector mounting slot which is accessible from said bottom side and said rear end of said keyboard housing, said keyboard module further having a first electrical connector unit disposed in said connector mounting slot adjacent to said rear end of said keyboard housing, each of said left and right side walls being formed with a pivot hole adjacent to said rear end of said keyboard housing;
   a display module including a display housing having a lower end connected pivotally to said rear end of said keyboard housing; and
   a battery module including an elongated battery housing adapted for receiving a battery set therein, said battery housing having first and second ends which are opposite to each other in a longitudinal first direction of said battery housing, said battery module further including a second electrical connector unit which projects from said battery housing in a second direction transverse to the first direction, which is adapted to connect electrically with the battery set that is received in said battery housing, and which is extendible into said connector mounting slot in said keyboard housing for connecting matingly with said first electrical connector unit so as to supply electric power to said keyboard module, said battery module further including confronting first and second mounting units mounted respectively on said first and second ends of said battery housing and projecting relative to said battery housing in the second direction, said first mounting unit having a distal end provided with a first cylindrical stud which extends in the first direction toward said second mounting unit and which is inserted rotatably and removably into said pivot hole in one of said left and right side walls of said keyboard housing, said second mounting unit including:
   a casing having a connecting end portion secured to said second end of said battery housing, and a mounting end portion extending from said connecting end portion and projecting relative to said battery housing in the second direction, said casing having a first side wall facing said first mounting unit, and a second side wall opposite to said first side wall in the first direction,
   a depressible operating member mounted on said second side wall of said casing at said connecting end portion of said casing,
   a pivot shaft mounted fixedly in said casing between said connecting and mounting end portions of said casing, and extending in a third direction transverse to the first and second directions,
   a second cylindrical stud mounted on said first side wall of said casing at said mounting end portion of said casing, and inserted rotatably and removably into said pivot hole in the other one of said left and right side walls of said keyboard housing,
   a lever disposed in said casing and having a first end connected pivotally to said depressible operating member, a second end opposite to said first end and connected pivotally to said second cylindrical stud, and an intermediate portion mounted pivotally on said pivot shaft, and
   a biasing member disposed in said casing for biasing said depressible operating member in a direction away from said first side wall to enable said depressible operating member to project from said second side wall and to enable said second cylindrical stud to project from said first side wall of said casing, said depressible operating member being depressible against biasing action of said biasing member so as to enable said lever to pivot about said pivot shaft and to retract said second cylindrical stud into said casing for disengaging said second cylindrical stud from said pivot hole in the other one of said left and right side walls of said keyboard housing.

2. The portable computer assembly as claimed in claim 1, wherein said second side wall of said casing of said second mounting unit is formed with a mounting hole for receiving said depressible operating member therein, said depressible operating member including a press button having a peripheral flange for abutting against said second side wall so as to limit movement of said depressible operating member away from said first side wall.

3. The portable computer assembly as claimed in claim 1, wherein said first electrical connector unit includes a plurality of first contact terminal pairs, each of which defines a clamping space, said second electrical connector unit including a plurality of parallel second contact terminals, each of which extends into and is retained in said clamping space of a respective one of said first contact terminal pairs for clamping by the respective one of said first contact terminal pairs.

* * * * *